UNITED STATES PATENT OFFICE.

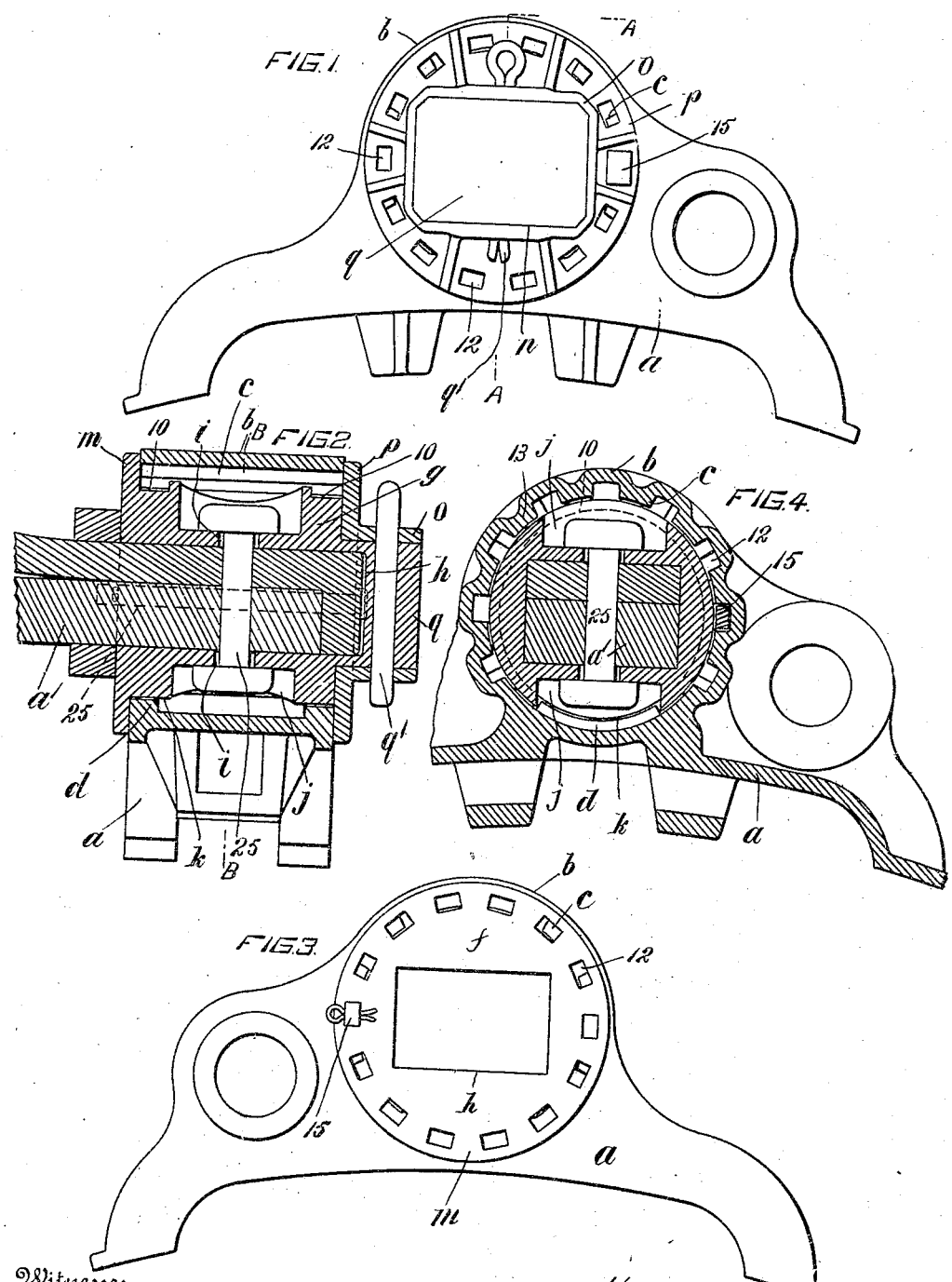

WILLIAM STEPHEN ATWOOD, OF MONTREAL, QUEBEC, CANADA, ASSIGNOR, BY DIRECT AND MESNE ASSIGNMENTS, TO SIMPLEX RAILWAY APPLIANCE COMPANY, OF HAMMOND, INDIANA.

ADJUSTABLE LOCKING DEVICE.

No. 849,133.

Specification of Letters Patent.

Patented April 2, 1907.

Application filed March 10, 1905. Serial No. 249,479.

*To all whom it may concern:*

Be it known that I, WILLIAM STEPHEN ATWOOD, of the city of Montreal, Province of Quebec, Canada, have invented certain new and useful Improvements in Adjustable Locking Devices; and I do hereby declare that the following is a full, clear, and exact description of the same.

My invention relates particularly to the means for locking a brake head in different angular positions upon a brake beam although it can be applied with advantage in almost any case where adjustment is required between two parts.

The invention has for its object to provide a simple and positive locking device capable of minute adjustment, and it may be said briefly to consist of a pair of members carried one by each of the parts to be adjustably connected together and each being constructed to present a series of equi-distant devices adapted to afford means whereby a locking engagement is effected between the members when one of the latter is adjusted relatively to the other a distance a fraction greater or less than the space between the devices of either series.

For full comprehension, however, of my invention reference must be had to the accompanying drawings forming a part of this specification in which similar reference characters indicate the same parts and wherein—

Fig. 1 is a side elevation of a brake head constructed according to my invention;

Fig. 2 is a transverse sectional view taken on lines A A, Fig. 1; and

Fig. 3 is an elevation of the opposite side of the head to that shown in Fig. 1.

Figure 4 is a transverse section taken on the line B B of Figure 2.

The head, $a$, proper is in the main of usual construction the invention being applied to the means for locking such head in different angular positions upon the brake beam, $a'$ which is also of usual construction.

This locking means consists of a particular formation of the head which is constructed to present a cylindrical portion $b$ having on its interior a series of axial ribs $c$ and a pair of segmental flanges $d$ at each end of the interior of such cylindrical portion and at the side thereof adjacent to the bearing-face of the head. The flanges are for the purpose of taking all strains off the locking collar $o$ and flange $m$ to be presently described.

A flanged sleeve $f$ fits into the cylindrical portion of the head and coacts with the ribs $c$ on the cylinder and a locking pin 15 to lock the head in any desired angular position upon the brake beam.

This sleeve consists of a cylindrical block $g$ cored out as at $h$ to fit upon the end of the brake beam $a'$ and having a pair of diametrically opposite rivet holes $i$ the outer ends whereof are located concentrically to a pair of recesses $j$ in the perimeter of the block or sleeve $f$ while such perimeter is further recessed as at $k$ to provide a path for the flanges $d$ when the parts are being assembled. One end of the block has an annular flange $m$ rigidly carried thereon and the other end thereof is square, as at $n$, to receive a flanged collar $o$ the flange $p$ whereof corresponds to the flange $m$. The square end of the block is formed with a perforated enlargement $q$ through which a split pin $q'$ is passed to lock such collar in place after the part $f$ has been fitted into the part $b$. Each end of the part $f$ is recessed as at 10 to receive the flanges $d$.

The collar $o$ and flange $m$ are formed with holes 12 a distance apart different to the width 13 of the axial ribs $c$ on the cylinder the spaces between the ribs being equal in cross-section to the holes 12. A pin 15 is adapted to be inserted into the particular holes 12 in the collar $o$ and flange $m$ which coincide with one of the spaces between the ribs $c$ thereby locking the part, $a$, against rotary movement upon $f$ which being mounted through its squared interior upon the brake beam, cannot turn.

The location of the holes 12 at distances apart different to the distances which separate the spaces between the ribs $c$, allows of minute adjustment which is effected by moving the head (after pin 15 has been removed) around the part $f$ (with $m$ and $o$ thereon,) which, while displacing the holes 12 from the particular space between the ribs $c$ in which the pin 15 has previously been located will bring another pair of holes 12 into position to register with another of the spaces between the ribs $c$.

To secure my improved adjustable head upon the brake beam the sleeve $f$ is first forced upon the end of the beam which then has a hole drilled therethrough in line with the rivet holes i, and a rivet 25 is finally driven through such holes, and is headed in the usual manner.

What I claim is as follows:

1. The combination with a brake beam and a brake head carried by the brake beam, and constructed with a hollow cylindrical part the interior whereof has a regularly disposed series of devices, of a cylindrical block carried by the brake beam and fitting rotatably within the cylindrical part of the head such block having an annular flange formed rigidly upon one end a flanged collar secured upon the opposite end thereof, such flanges being formed with corresponding series of equi-distant devices the devices of such series being disposed a distance apart different to the distance separating the devices of the head whereby the brake head can be secured in different angular positions upon the brake beam.

2. The combination with a brake beam and a brake head carried by the brake beam, and constructed with a hollow cylindrical part the interior whereof has a regularly disposed series of axially extending grooves, of a cylindrical block carried by the brake beam and fitting rotatably within the cylindrical part of the head such block having an annular flange formed rigidly upon one end, a flanged collar secured upon the opposite end thereof, such flanges being formed with corresponding series of equi-distant holes the holes of such series being disposed a distance apart different to the distance separating the grooves of the head, and a pin adapted to be inserted into a coinciding pair of such holes and one of the grooves in the head whereby the brake head can be secured in different angular positions upon the brake beam.

3. The combination of a brake beam and a brake head mounted concentrically on the beam, one of said parts having an odd number and the other an even number of locking members, and a key for forming a locking connection between a pair of said members.

4. The combination of a brake beam, a brake head concentrically and rotatably mounted thereon, and an adjustable connection between said beam and head comprising on one part an odd number and on the other part an even number of relatively disposed locking parts, and a key for forming a locking connection between a pair of said locking parts.

5. The combination of a brake beam and a brake head each embodying a sleeve constructed to fit concentrically one within the other, one of said sleeves having an odd number and the other an even number of locking members, and a key for forming a locking connection between a pair of said members.

6. The combination of a brake beam and a brake head each embodying a sleeve constructed to fit one within the other, one of said sleeves being provided exteriorly and the other interiorly with a plurality of locking faces, an odd number on one end an even number on the other, and a key for forming a locking connection between a pair of said faces.

7. The combination of a brake beam and a brake head each embodying a sleeve constructed to fit one within the other, the sleeve on the head being provided with openings in its periphery and interiorly located locking faces between said openings, the sleeve on the beam being provided with exteriorly located locking faces, one of said sleeves having an odd and the other an even number of said locking faces, and a key for forming a locking connection between a pair of said faces.

8. The combination of a brake beam, a brake head concentrically rotatably mounted thereon, and an adjustable connection between said beam and head comprising on one part a plurality of locking members spaced apart and on the other part a plurality of locking members spaced apart a greater distance than the members on the first part, and a key for forming a locking connection between a pair of said locking parts.

9. The combination of a brake beam and a brake head mounted upon said brake beam, one of said parts having a number of locking members differently spaced from the locking members carried by the other, and a key for forming a locking connection between said members.

10. The combination of a brake beam and a brake head, locking devices on said beam and head, the locking devices on the beam being disposed at distances apart differently spaced from those separating the locking devices on the head, and a member for forming a locking connection between said devices.

In testimony whereof I have signed my name to this specification in the presence of two subscribing witnesses.

WILLIAM STEPHEN ATWOOD.

Witnesses:
WILLIAM P. McFEAT,
FRED. J. SEARS.